United States Patent Office 3,437,928
Patented Apr. 8, 1969

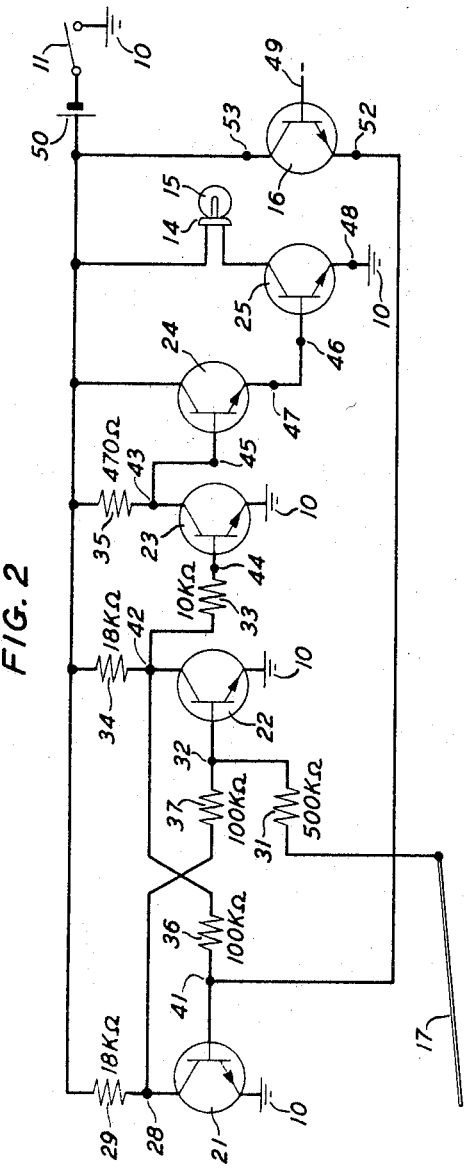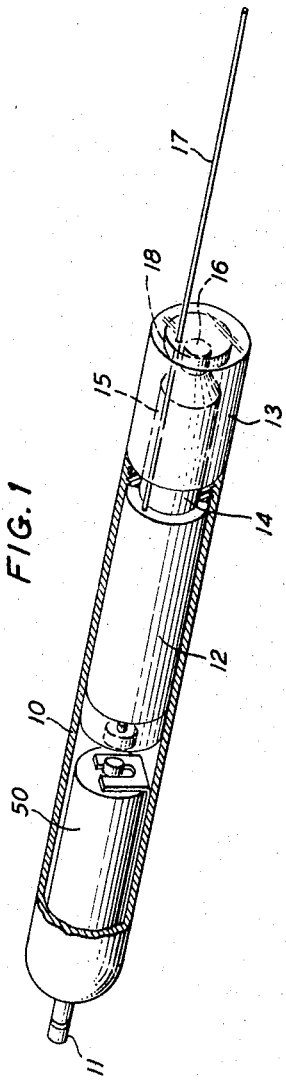
INVENTORS W. E. BAKER
D. M. FOLTZ
BY
ATTORNEY

3,437,928
SELF-CONTAINED TEST PROBE WITH INDICATOR LAMP RESPONSIVE TO CONTINUOUS OR PULSED VOLTAGES
William E. Baker, Middletown, and Daniel M. Foltz, Red Bank, N.J., assignors to Bell Telephone Laboratories, Incorporated, New York, N.Y., a corporation of New York
Filed Dec. 21, 1964, Ser. No. 419,996
Int. Cl. G01r 19/14, 19/16
U.S. Cl. 324—133                         4 Claims

ABSTRACT OF THE DISCLOSURE

A test probe for detecting continuous or pulsed voltages employ its own power source, an indicator lamp, and circuitry for lighting the lamp in response to input signals above a certain level. The signals are applied from a metallic probe to a bistable transistor flip-flop switch. When the signals are greater than a selected magnitude, the lamp is lighted. A photodiode or the like adjacent to the lamp conducts when the lamp intensity reaches a predetermined level, causing the flip-flop to switch, provided that the voltage input is no longer present. Regardless of pulse duration, the arrangement allows the indicator lamp to stay lit long enough to be seen.

---

This invention relates to electrical testing apparatus and in particular to instruments for use with logic circuitry for detecting conveniently the presence of continuous or pulsed voltages therein.

The increasingly widespread use of solid state circuitry performing logic functions has spurred the search for a device that gives fast, reliable and unmistakable indication of the state, on or off, of the logic circuit gates. The very large number of logic gates in some types of equipment as, for example, in electronic computers and in electronic telephone switching systems, has further complicated the troubleshooting task both in manufacture and in routine maintenance.

The logic circuit gates are controlled by pulsed or continuous voltages of a definite magnitude. The usual troubleshooting is accomplished with a voltmeter or oscilloscope by applying manually a pair of test leads to a gate while reading the scope or meter to ascertain the state at the gate. One test lead is connected to the system's ground while the other lead is clipped or held to the test point. In reading the indicator or scope face, the technician frequently must withdraw his attention from the test point and concentrate on the instrument reading. In the course of this operation it not infrequently happens that the test leads slip off the test terminal, unbeknowst to the technician, and the resultant faulty reading may go unnoticed. Even if not, the repeated alternations of the technician's attention from the test point to the test instrument are time consuming as well as fatiguing.

A further drawback to the use of oscilloscopes or meters in testing logic gates lies in the scope setup time involved, particularly the adjustments necessary for detecting very short pulses. Even with a finely adjusted good quality oscilloscope, however, the traits of a very short pulse can go unobserved. Voltmeters with needle type indicators are still less suitable for detecting short pulses.

Moreover, due to the very large number of test points involved in logic circuit checkout, the test lead wires which might be tolerated in other operations are here too frequently in the way and in need of adjustment. Even the short test leads associated with portable instruments complicate not only the actual testing as already noted, but also the carrying of such instruments in, for example, a tool pouch, as well as their storage in instrument cabinets.

Accordingly, an object of the invention is to improve substantially the reliability and speed of logic circuit testing.

Another object of the invention is to enable the operator to see the test indication and the test point at the same time A further object of the invention is to eliminate substantially the body movement associated with current logic circuit testing methods A further object of the invention is to eliminate the need for any wires or leads connecting the system to be tested and the test instrument.

These and other objects are achieved in accordance with the invention by a small, battery powered test probe and a transistor circuit therein that detects either continuous or pulsed voltages of a specified magnitude, gives a visual indication thereof, and can return the test input signal safely through a high impedance path to system ground that includes the electro-conductive probe case itself and the user's body.

In accordance with the invention the entire test circuitry and the indicator, which conveniently is a lamp, are contained in a conductive tubular body, about the size of a pen. The operator grasps the probe in one hand and the system ground (chassis or frame) with the other, and touches the probe point to the test terminals in rapid succession, observing the lamp the whole time for appropriate indications. The circuit employs a transistor flip-flop that is set in a first position by a predetermined voltage level, thereby feeding the small input current from the test probe through amplifiers which control the indicator lamp. A photodiode in the beam conducts only when the lamp has been lit long enough to reach a specified intensity. This ensures sufficient time on for visual observation regardless of the pulse duration. All leads to the system under test are eliminated; and since the operator sees the lamp and the test point simultaneously, his work is made easier, faster and more reliable.

In one illustrative embodiment of the invention the housing or probe handle is an elongated tube and the test probe lead protrudes from within a few inches. The small (one or two microamperes) input current is fed through a high impedance element and forms an input to one of a pair of transistors arranged in flip-flop configuration. The flip-flop is set in a first position by a large enough (2 volts) input voltage level, thereby activating an amplifying and control subcircuit which turns on the lamp. A photodiode near the lamp and associated with the flip-flop switch resets the latter when the lamp reaches a predetermined intensity level. The duration of its illumination is designed to be sufficiently long to ensure visual observation. If the input was a microsecond pulse, the novel circuit and indicating arrangement will produce a lamp flash of much longer duration so that an operator will not miss it. If the input is a continuous voltage at or above specified magnitude, the lamp remains lit as long as the continuous voltage input is present. The circuit includes sufficiently high internal impedances to ensure a wide margin of safety for the operator, if the rated input voltage or amperage is exceeded. This impedance ensures that the current in the return path to system ground via the conductive casing and the user's body will be non-injurious.

Accordingly, a feature of the invention lies in a circuit for test instruments that designedly is grounded to its own chassis and employs this as part of a high impedance including the user's body, to the ground path of the system under test, thereby eliminating the usual ground lead.

A second feature of the invention resides in a circuit arrangement that turns on a visual indicator in response to an input signal of specified magnitude, irrespective of its duration; and that turns off the indicator when the input signal is removed or when a predetermined time has elapsed since the commencement of the input signal, whichever occurs later.

An additional feature of the invention resides in a completely self-contained hand-held test probe with a visual indicator wherein the operator can see the indicator and the test point simultaneously, and can proceed from point to point without interruptions for reading a remote instrument or for adjusting test leads.

These and other objects and features of the invention will be more readily understood from the following detailed description of an illustrative embodiment thereof and from the drawing in which:

FIG. 1 is a perspective showing the probe in partial cutaway; and

FIG. 2 is the probe circuit diagram.

Referring first to FIG. 1, the probe consists of a housing 10 that is pen-like in shape for ease of handling and carrying. At one end of housing 10 a switch 11 is mounted to provide current to the circuitry which is indicated generally as 12 in FIG. 1. At the second end of the probe there is mounted a cover 13 made of translucent plastic or the like and that fits onto housing 10 by any convenient means as, for example, a press fit. Beneath cover 13 is mounted a socket 14 for holding an indicator lamp 15. Near lamp 15, preferably directly in its beam, is a light sensitive element 16 such as a photodiode, that helps control the duration of lighting. A metallic probe 17 extends outwardly from housing 10 beneath cover 13 and through a translucent disk 18 that protects the space within cover 13. Housing 10 is metallic and serves as a ground for the probe circuit.

In the illustrative embodiment of the test probe circuit described below, it is assumed that in the logic circuits to be tested the two voltage levels employed in the logic are: ground potential for one state; and a positive potential exceeding three (3) volts for the other state. The illustrative circuit could be modified, of course, to operate also on negative type logic; and could also be modified to operate on logic using a smaller positive potential for the non-zero voltage state, or some reference level other than zero voltage. In the probe circuit described both D.C. positive levels and positive pulses are detected.

To use the probe, the technician turns on switch 11, grasps with one hand the housing 10 of the probe, making contact with the ground site of the circuit, and places lead 17 upon a test terminal (not shown). The other hand is placed on the frame of the equipment under test, which is assumed to be at ground potential. A path to system ground is thereby established by the user's body between the grounded housing 10 of the probe and the system ground.

Referring to FIG. 2, battery 50 which is of the order of 1.5 volts powers the circuit through switch 11. Transistors 21 and 22 serve as a control for a two-stage current amplifier consisting of transistors 23 and 24, the output of wihch controls the state of transistor 25 that operates as a switch for lamp 15. Probe 17 is connected through a resistor 31 to the base terminal 32 of transistor 22. The value of resistor 31 is chosen sufficiently high so as to comprise a high impedance for any D.C. levels or pulses encountered in logic circuit testing.

Operation of the circuit on a continuous voltage input is as follows. If the potential of the terminal being tested exceeds the three (3) volts for which this illustrative circuit is designed, the current through resistor 31 will be sufficient to turn on transistor 22. Collector terminal 42 of transistor 22 is connected through a resistor 33 to base terminal 44 of transistor 23. Similarly, collector terminal 43 of transistor 23 is connected directly to the base terminal 45 of transistor 24. Collector terminal 42 of transistor 22 is connected to base lead 41 of transistor 21 through a resistor 36 and collector terminal 28 of transistor 21 is connected through a resistor 37 to base lead 32 of transistor 22. Resistors 29, 34 and 35 are external to collector terminals 28, 42 and 43, respectively. When transistor 22 is turned on, transistors 21 and 23 will turn off, since essentially all of the current passing through the resistor 34 will be shunted to ground through transistor 22. Since transistor 23 is not conducting, all of the current through resistor 35 which flows to ground when transistor 23 is on will drive the base terminal 45 of transistor 24 causing it to turn on. The output of transistor 24 in turn drives transistor 25, turning it on. Thus lamp 15 is connected between voltage supply source 50 and ground 10 through the saturated transistor 25.

Photodiode 16 is connected through its collector 52 to the base lead 41 of transistor 21. Its photo input 49 is located physically close to lamp 15. When lamp 15 is turned on the impedance across photodiode 16 becomes very low allowing current to flow to base 41 of transistor 21, turning same on. When this occurs, the current through resistor 29 no longer flows through the resistor 37 to base 32 of transistor 22, but rather flows to ground via transistor 21. However, as long as probe tip 17 is contacting a potential exceeding 3 volts in this illustrative embodiment, transistor 22, and therefore lamp 15, will remain on. When probe 17 is removed from the potential, transistor 22 is turned off and current is driven into the base 42 of transistor 23, turning it on. With transistor 23 on the current through 33 is diverted to ground 10 and transistors 24 and 25 are thereby turned off extinguishing lamp 15.

In accordance with the invention the operation of the test probe on inputs consisting of a positive pulse or pulses is as follows. As already noted, transistors 21 and 22 comprise a flip-flop switch which when probe tip 17 contacts a terminal having pulses with amplitude exceeding three (3) volts, is set with transistor 22 on and transistor 21 off. Lamp 15 is thereby turned on in the manner described above. When lamp 15 has reached a brightness level sufficient to cause photodiode 16 to conduct, the flip-flop will be reset thereby extinguishing lamp 15. In accordance with one aspect of the invention, therefore, the circuit requires that the brightness of lamp 15 shall exceed a certain visible threshold value before the flip-flop is reset and the lamp extinguished. It will be apparent to persons skilled in the art that circuit values may be selected to ensure a flash of duration sufficient to be seen by the user.

Transistors 21 through 23 and 25 used in the circuit in FIG. 2 are silicon, Western Electric type 16J. Transistor 24 is a germanium NPN type 2N634 transistor. It is also readily apparent that the circuit may be modified by persons skilled in the art so as to operate on negative logic; and on logic using a smaller positive potential for the nonzero voltage state. In these cases as in the illustrative embodiment described, the return path to ground for the circuit and the input signals is via the housing 10 and the body of the user in accordance with the invention, thus eliminating the need for leads.

What is claimed is:

1. A test probe for detecting continuous or pulsed voltages greater than a reference level by a specified magnitude, comprising in combination:

an internally contained power source;

an indicator lamp;

first and second transistors each comprising base, collector and emitter electrodes and arranged as a bistable flip-flop switch;

means connecting said source, said switch and said lamp such that said lamp is normally extinguished;

input voltage receiving means connected to said second transistor base;

means responsive to applied input voltages greater than said specified magnitude for placing said switch in a first mode to complete and hold a circuit connection between said source and said lamp;
a light sensitive element mounted adjacent to said lamp;
means including said element responsive to lamp intensity above a predetermined level for placing said switch in a second mode to open said circuit connection between said lamp and said source;
whereby said lamp is extinguished upon the withdrawal of said applied input voltage or upon the occurrence of lamp intensity above said predetermined level, whichever occurs later.

2. A test proble in accordance with claim 1, further comprising an elongated electroconductive housing adapted to be grasped in the hand of a user, a circuit connection between said input signal receiving means and said housing, comprising a high impedance resistive element serially connected to said second transistor base electrode with the emitter electrode of said second transistor being grounded to said electroconductive housing, whereby said input voltage is connected to the ground of the system under test through said high impedance element, said housing, and at least a portion of the body of the user, thereby to eliminate need for a ground wire.

3. A test probe in accordance with claim 2 wherein said voltage reference level is ground and wherein said specified magnitude is substantially +2 volts.

4. A test probe in accordance with claim 3 wherein said circuit-completing means further comprises a current amplifier connected to said power source between said flip-flop switch and said lamp, for amplifying the relatively small input signal current sufficiently to operate said lamp.

References Cited
UNITED STATES PATENTS

| | | | |
|---|---|---|---|
| 2,474,073 | 6/1949 | Sundt | 324—133 XR |
| 2,808,559 | 10/1957 | Engle | 324—96 X |
| 2,942,189 | 6/1960 | Shea et al. | 324—133 |
| 2,963,692 | 12/1960 | Barter et al. | 324—51 XR |
| 3,020,418 | 2/1962 | Emile | 340—252 XR |
| 3,033,988 | 5/1962 | Edgerton | 250—205 |
| 3,090,039 | 5/1963 | Walls | 340—252 |
| 3,136,920 | 6/1964 | Jensen | 340—248 XR |
| 3,168,728 | 2/1965 | Porath | 340—252 |
| 3,175,165 | 3/1965 | Dayhoff | 331—66 |
| 3,201,773 | 8/1965 | Magee | 340—248 |

OTHER REFERENCES

Mintzer et al.: Voltage Sensing Circuit, RCA Technical Notes, No. 265, June 1959.

RUDOLPH V. ROLINEC, *Primary Examiner.*

G. R. STRECKER, *Assistant Examiner.*

U.S. Cl. X.R.

324—72.5, 96; 340—248